No. 785,878. PATENTED MAR. 28, 1905.
A. G. HEISEY.
CORN HARVESTER.
APPLICATION FILED DEC. 8, 1904.
2 SHEETS—SHEET 1.
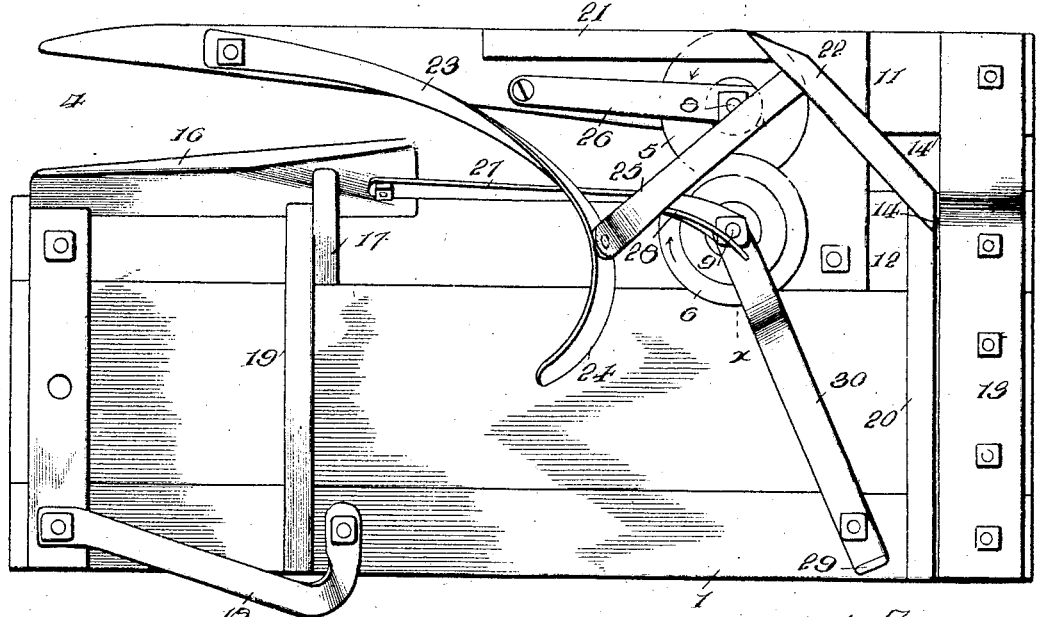
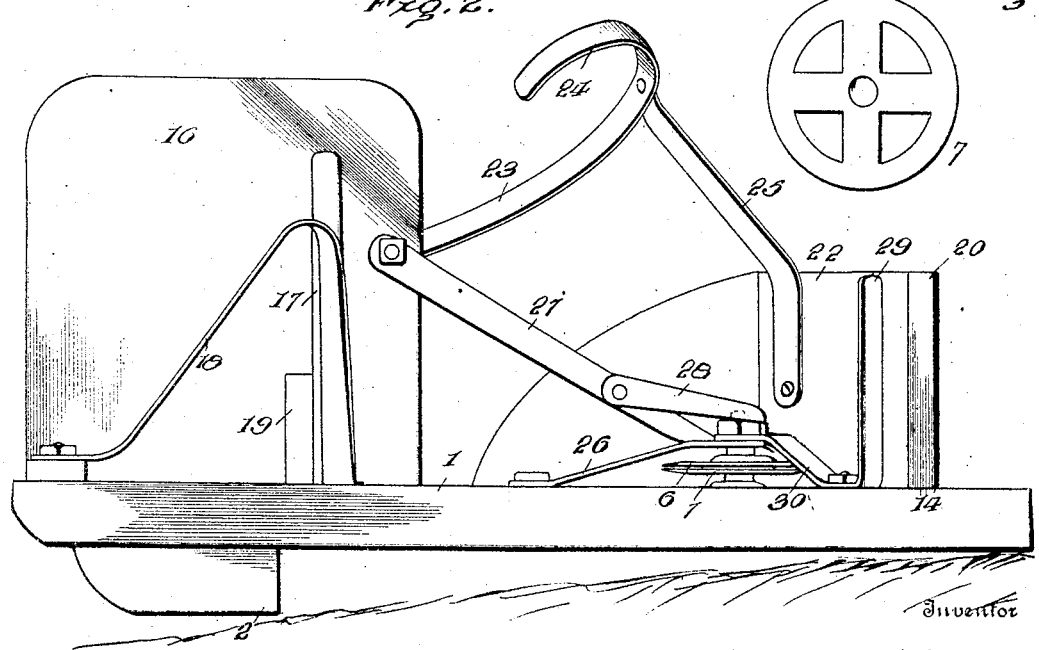
Witnesses
Inventor
A. G. Heisey.
By
Attorneys

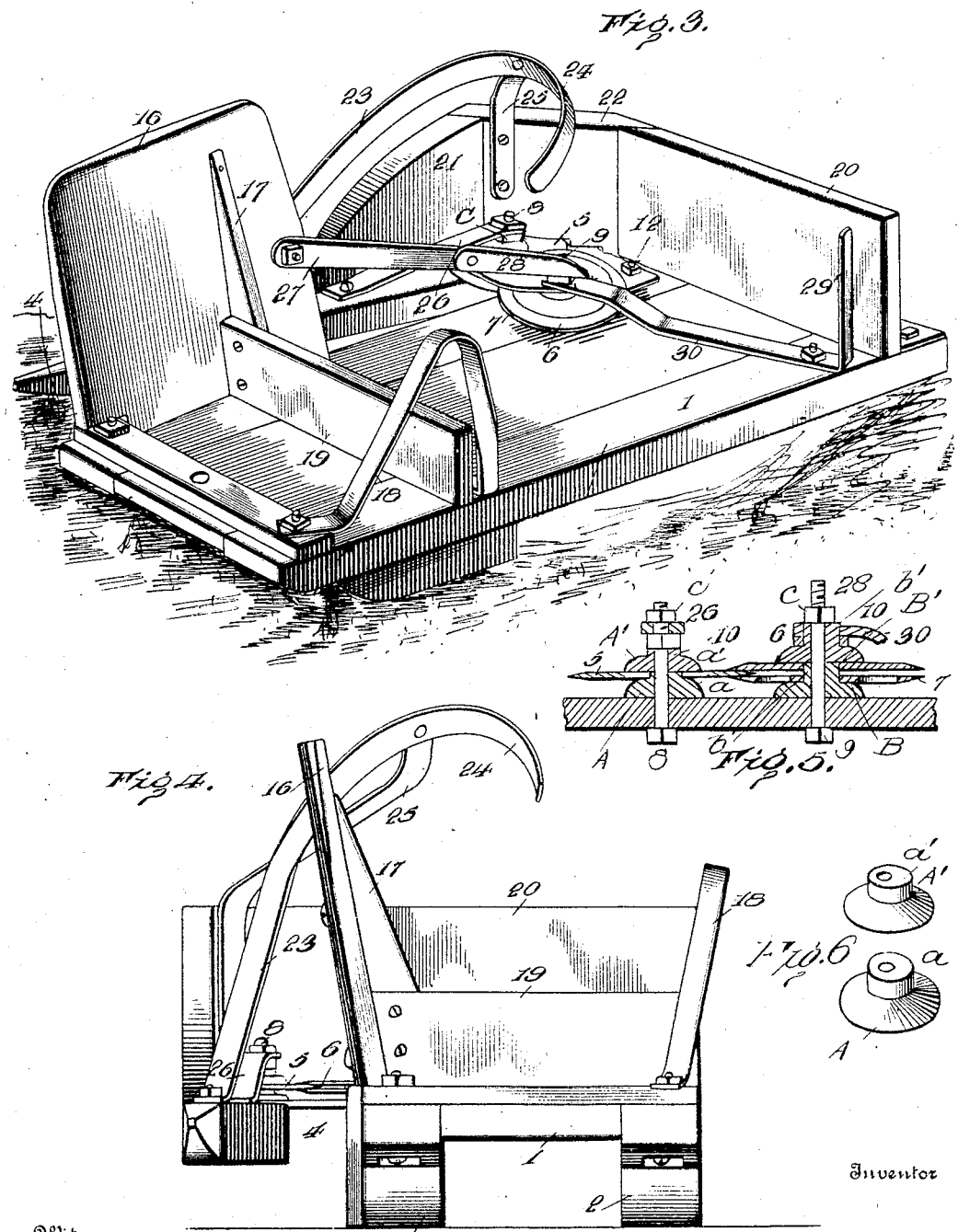

No. 785,878. Patented March 28, 1905.

UNITED STATES PATENT OFFICE.

ABRAHAM G. HEISEY, OF CUSHING, OKLAHOMA TERRITORY.

CORN-HARVESTER.

SPECIFICATION forming part of Letters Patent No. 785,878, dated March 28, 1905.

Application filed December 8, 1904. Serial No. 236,028.

*To all whom it may concern:*

Be it known that I, ABRAHAM G. HEISEY, a citizen of the United States, residing at Cushing, in the county of Payne, Territory of Oklahoma, have invented certain new and useful Improvements in Corn-Harvesters, of which the following is a specification.

This invention is designed to lessen the labor, minimize the expenditure of power, and greatly facilitate the harvesting of corn, cane, and like stalky grain, the improvement residing in the novel means embodied in the structure forming the basis of this application.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1 is a top plan view of a corn-harvester embodying the invention. Fig. 2 is a side view thereof. Fig. 3 is a perspective view of the harvester. Fig. 4 is a front view thereof. Fig. 5 is a transverse section of the cutting mechanism on the line $x\ x$ of Fig. 1. Fig. 6 is a detail view of the bearing and washer for the cutters. Fig. 7 is a detail view of the lower member of the double cutter.

Corresponding and like parts are referred to in the following description and indicated in all the views of the drawings by the same reference characters.

The platform 1 may be supported in any manner so as to be impelled over the field and, as shown, is provided at its front end with runners 2, which elevate it the required distance from the ground. It is to be understood that the cutting mechanism may be positively actuated by any means; but it is preferred to mount its cutters for free rotation by contact of the stalks therewith. A passage 4 is provided near one side of the machine and extends lengthwise of the platform and flares toward its receiving end and is provided at its inner or rear end with the cutting mechanism, which preferably consists of one or more rotary knives. As illustrated, companion rotary cutters are employed, the one, 5, being single and the other double and consisting of an upper member 6 and a lower member 7, spaced apart a distance to receive between them an edge portion of the cutter 5. The rotary cutter 5 is mounted upon a bearing $a$, and the cutters 6 and 7 are mounted upon a bearing $b$. The bearing $a$ is formed at the upper end of a washer A and bearing $b$ at the upper end of a similar washer B, the bearings being eccentric to their respective washers to admit of adjusting the coöperating cutters a greater or less distance apart to compensate for wear incident to sharpening. A vertical shaft or journal 8 receives the washer A, and a shaft or journal 9 receives the washer B. These journals are arranged upon opposite sides of the passage 4 and serve to clamp the respective washers A and B. A washer A' is placed upon washer A and is similar in construction thereto and has a bearing $a'$ and is adapted to change places with said washer when bearing $a$ becomes worn. A washer B', having eccentric bearing $b'$, is arranged above washer B and is interchangeable therewith. All the washers are mounted upon the respective journals 8 and 9 and are confined thereon by set-nuts $c$, threaded upon the upper ends of said journals. When the nuts $c$ are loosed, the washers A and B may be turned to adjust the centers toward and from each other. The lowermost cutter 7 is formed with openings to provide an escape for any matter forced between the cutters 6 and 7 when the machine is in operation.

A guard 16 is located upon the platform, upon the inner side of the passage 4, at the entrance thereof, and inclines slightly from the perpendicular, so as to overhang the passage 4 and cause the corn, cane, or the like to lean toward the outer side of the passage 4 in its travel therethrough. The guard 16 consists of a plate or board and projects to some distance from the platform and along the passage 4. A standard 17 braces the guard 16. The part 16 also serves as a holder to support a quantity of corn, cane, or the like when received upon the platform. A standard 18 at the opposite side of the platform acts jointly with the guard 16 to retain the corn or cane upon the platform until a sufficient quantity has accumulated to form a shock or gravel. A wrist 19 extends transversely of the platform between the parts 16 and 18 and supports the front ends of the stalks and holds them above the platform, thereby enabling a binder to be conveniently passed therearound or the stalks to be gathered when it is required to deposit them in a bunch upon the ground.

A butt-board 20 is provided at the rear end of the platform and serves to even the stalks. A fender 21 is located at the rear end of the passage 4, upon the outer side thereof, and an inclined wall 22 connects the rear end of the fender 21 with the proximal end of the butt-board 20 and serves to move the stalks laterally and away from the cutting mechanism in the operation of the machine.

A guard 23, consisting of a bar, is attached at its lower end to the platform 1, at the outer side of the passage 4 and near the front end thereof, and inclines upwardly and rearwardly and terminates in the curved end 24, which extends across the passage 4 and overhangs the platform at the inner side thereof. The purpose of the guard 23 is to incline the heads or tops of the stalks forward and laterally, so that when cut they will fall upon the platform between the parts 16 and 18 with the butts to the rear and the heads to the front. A brace 25 connects the guard 23 with the inclined wall 22.

A brace 26 is arranged upon the outer side of the passage 4 near its rear end and is attached at its front end to the platform and at its rear end to the journal 8 at a point above the cutters and washer. This brace 26 also acts in the capacity of a guard and prevents matter lodging upon the cutter 5 and impeding the action thereof.

A bar 27, attached at its upper end to the guard 16, inclines rearwardly and downwardly and is connected at its rear end to the journal 9 and materially assists the action of the guard 23 in compelling the stalks when cut to fall upon the platform at the inner side of the passage 4. A bar 28 is connected to the lower rear portion of the bar 27 and inclines rearwardly and downwardly and is inwardly curved and rests upon the clamp-nut c, applied to the upper end of the journal 9, and prevents the stalks catching thereon.

A standard 29 is located upon the same side of the platform with the standard 18 and serves to retain the stalks in place. The standard 29 is preferably a part of a bar 30, which is arranged transversely of the platform near its rear end and is pierced to receive the journal 9, the end portion of the bar 30 inclining and overhanging the cutter 6.

It is to be understood that the harvester is to be impelled over the field in any manner, the same being positioned so as to cause the stalks, cane, or the like to enter the passage 4 and to move rearward through said passage to the cutter mechanism which severs them from the stubs or roots. In their rearward passage the heads or tufts of the stalk are bent forward and laterally, and when severed by the cutting mechanism the butts are urged inward by the combined action of the inclined wall 22 and the bars 27 and 28, the stalks finally dropping upon the platform and resting on the parts 19 and 30 with their butts against the board 20.

Having thus described the invention, what is claimed as new is—

1. In combination, a platform having a longitudinal passage, cutting mechanism at the inner or rear end of said passage, a butt-board at the rear end of the platform, a fender at the outer side of the passage opposite to the cutting mechanism, front and rear standards at the outer side of the platform for supporting the stalks thereon, a guard upon the inner side of the passage near the front end and acting jointly with the front standard to hold the stalks in place, a rest between the front standard and guard, and a transverse bar inclined outward and downward toward the rear standard.

2. In a corn-harvester, the combination of a platform having a longitudinal passage near one side, coöperating rotary cutters at the inner end of said passage, a guard 16 upon the inner side of said passage at the front end thereof and inclined toward its upper end to overhang the passage, a standard 18 opposite to the guard 16, a rest 19, a guard 23 upwardly and rearwardly inclined and laterally curved, bar 27 inclined rearwardly and downwardly, bar 28 attached to the bar 27 and extended over the topmost fastening of the journal of the rotary cutter at the inner side of the aforesaid passage, upwardly and rearwardly inclined bar 26, fender 21, butt-board 20, inclined wall 22, standard 29, and transverse bar 30, the parts being arranged to operate substantially in the manner set forth.

In testimony whereof I affix my signature in presence of two witnesses.

ABRAHAM G. HEISEY. [L. S.]

Witnesses:
C. L. LYON,
WILL HAYS.